US008632880B2

(12) United States Patent
Takahashi et al.

(10) Patent No.: US 8,632,880 B2
(45) Date of Patent: Jan. 21, 2014

(54) AQUEOUS PRESSURE-SENSITIVE ADHESIVE COMPOSITION AND UTILIZATION THEREOF

(75) Inventors: Akiko Takahashi, Ibaraki (JP); Mami Ikeya, Ibaraki (JP)

(73) Assignee: Nitto Denko Corporation, Ibaraki-Shi, Osaka (JP)

( * ) Notice: Subject to any disclaimer, the term of this patent is extended or adjusted under 35 U.S.C. 154(b) by 599 days.

(21) Appl. No.: 12/274,505

(22) Filed: Nov. 20, 2008

(65) Prior Publication Data

US 2009/0137727 A1 May 28, 2009

(30) Foreign Application Priority Data

Nov. 22, 2007 (JP) ................................ 2007-302754

(51) Int. Cl.
*B32B 7/12* (2006.01)
(52) U.S. Cl.
USPC .............. 428/355 AC; 428/317.3; 428/317.7; 428/319.3; 428/343; 428/355 R; 428/447; 428/497; 428/500; 428/522; 524/270; 524/272; 524/547; 524/560
(58) Field of Classification Search
USPC ........... 428/447, 497, 500, 522, 317.3, 317.7, 428/319.3, 343, 355 AC, 355 R; 524/270, 524/272, 474, 490, 501, 502, 801, 806, 832, 524/833, 547, 560
See application file for complete search history.

(56) References Cited

U.S. PATENT DOCUMENTS

| | | | |
|---|---|---|---|
| 5,623,011 A | 4/1997 | Bernard | |
| 5,753,362 A * | 5/1998 | Kawase et al. | 428/327 |
| 7,008,987 B2 * | 3/2006 | Okada et al. | 524/261 |
| 7,045,568 B2 * | 5/2006 | Naito et al. | 524/547 |
| 2005/0038152 A1 | 2/2005 | Naito et al. | |
| 2005/0064125 A1 * | 3/2005 | Tsukida et al. | 428/40.1 |
| 2007/0207312 A1 | 9/2007 | Ikeya et al. | |
| 2008/0033096 A1 | 2/2008 | Takahashi et al. | |
| 2008/0138617 A1 | 6/2008 | Takahashi et al. | |
| 2009/0137726 A1 | 5/2009 | Takahashi et al. | |

FOREIGN PATENT DOCUMENTS

| | | |
|---|---|---|
| CN | 1158139 A | 8/1997 |
| CN | 1566245 A | 1/2005 |
| CN | 1612921 A | 5/2005 |
| EP | 1 486 548 A | 12/2004 |
| EP | 1 887 063 A1 | 2/2008 |
| JP | 02-150482 A | 6/1990 |
| JP | H05-230428 A | 9/1993 |
| JP | 07-026229 A | 1/1995 |
| JP | 08-165464 A | 6/1996 |
| JP | 10-046124 A | 2/1998 |
| JP | 2000-319610 A | 11/2000 |
| JP | 2001-131511 A | 5/2001 |
| JP | 2001-316652 A | 11/2001 |
| JP | 2003-073637 A | 3/2003 |
| JP | 2004-189933 A | 7/2004 |
| JP | 2004-339379 A | 12/2004 |
| JP | 2005-227711 A | 8/2005 |
| JP | 2006-045412 A | 2/2006 |
| JP | 2006-249191 A | 9/2006 |
| JP | 2006-265537 A | 10/2006 |
| JP | 2006-348143 A | 12/2006 |
| JP | 2007-023068 A | 2/2007 |
| JP | 2007-039607 A | 2/2007 |
| JP | 2007-112842 A | 5/2007 |
| JP | 2007-131860 A | 5/2007 |
| JP | 2007-197693 A | 8/2007 |
| JP | 2007-217594 A | 8/2007 |
| JP | 2007-262201 A | 10/2007 |
| JP | 2007-262380 A | 10/2007 |
| JP | 2008-037959 A | 2/2008 |
| JP | 2008-037960 A | 2/2008 |
| JP | 2009-126933 A | 6/2009 |
| WO | WO 93/18072 A1 | 9/1993 |

OTHER PUBLICATIONS

Chinese Patent Office, First Examination Opinion Notification in Chinese Patent Application No. 200810181827.1 (Jul. 21, 2011), English translation.
Chinese Patent Office, Second Notice of the Opinion on Examination in Chinese Patent Application No. 200810181827.1 (Dec. 23, 2011), English translation.
Chinese Patent Office, First Notice of the Opinion on Examination in Chinese Patent Application No. 200810181825.2 (Nov. 8, 2011), English translation.
European Patent Office, Extended European Search Report in European Patent Application No. 08019701.5 (Jan. 27, 2009).
European Patent Office, Extended European Search Report in European Patent Application No. 08019702.3 (Jan. 27, 2009).
Japanese Patent Office, Notice of Reasons for Refusal in Japanese Patent Application No. 2007-302753 (Apr. 22, 2010), English translation.
Japanese Patent Office, Notice of Allowance in Japanese Patent Application No. 2007-302753 (Jun. 30, 2011), English translation.
Japanese Patent Office, Notice of Reasons for Refusal in Japanese Patent Application No. 2007-302754 (Oct. 22, 2009), English translation.
Japanese Patent Office, Publications Submission Form in Japanese Patent Application No. 2007-302754 (Feb. 2, 2010), English translation.

(Continued)

*Primary Examiner* — James J Seidleck
*Assistant Examiner* — Marie Reddick
(74) *Attorney, Agent, or Firm* — Leydig, Voit & Mayer, Ltd.

(57) ABSTRACT

Provided are a pressure-sensitive adhesive (PSA) sheet having excellent foam repulsion resistance and an aqueous PSA composition suitable for preparing this sheet. The composition primarily comprises an acrylic polymer obtained by polymerizing a starting monomer material containing an alkyl(meth)acrylate as a main monomer and both acrylic acid and methacrylic acid. The acrylic polymer preferably has a weight average molecular weight of $65 \times 10^4$ to $100 \times 10^4$. The starting monomer material is preferred to further contain a silanol-forming monomer and polymerized without the silanol-forming monomer to produce a polymer having a gel fraction of 7 to 17 mass %. The post-crosslink PSA preferably has a gel fraction of 20 to 55 mass %.

10 Claims, 2 Drawing Sheets

(56) References Cited

OTHER PUBLICATIONS

Japanese Patent Office, Notice of Reasons for Refusal in Japanese Patent Application No. 2007-302754 (Jun. 3, 2010), English translation.

Japanese Patent Office, Publications Submission Form in Japanese Patent Application No. 2007-302754 (Dec. 28, 2010), English translation.

Chinese Patent Office, Second Notice of the Opinion on Examination in Chinese Patent Application No. 200810181825.2 (Sep. 26, 2012), English translation.

BASF SE, Opposition Against European Patent No. 2062955 (Nov. 24, 2011), English translation.

BASF SE, Appeal in European Patent No. 2062955 (Jul. 3, 2012), English translation.

European Patent Office, Interlocutory Decision in Opposition Proceedings in European Patent No. 2062955 (Apr. 5, 2012), English translation.

Japanese Patent Office, Examiner's Decision of Refusal in Japanese Patent Application No. 2007-302754 (Jan. 6, 2011), English translation.

Japanese Patent Office, Notice of Reasons for Rejection in Japanese Patent Application No. 2011-083344 (Apr. 18, 2013), English translation.

* cited by examiner

AQUEOUS PRESSURE-SENSITIVE ADHESIVE COMPOSITION AND UTILIZATION THEREOF

This Application claims priority based on Japanese Patent Application No. 2007-302754 filed on Nov. 22, 2007 and the entire content of the application is incorporated herein as reference.

BACKGROUND OF THE INVENTION

1. Field of the Invention

The present invention relates to an aqueous pressure-sensitive adhesive (PSA) composition containing an acrylic polymer as a main component and a PSA sheet using the same.

2. Description of the Related Art

An aqueous dispersion-type (aqueous) PSA composition in which an acrylic polymer is dispersed in water uses water as the dispersion medium and thus it is preferable to a solvent-type PSA composition in view of environmental concerns. In addition, a PSA layer superior in solvent resistance etc. and a PSA sheet having the same can be readily prepared from an aqueous acrylic PSA composition. Due to these circumstances, desired is an aqueous acrylic PSA composition to produce a PSA sheet of greater performance.

SUMMARY OF THE INVENTION

In an attempt to increase performance of aqueous acrylic PSA compositions, studies are conducted on structures (average molecular weights and so on) of polymers contained in the compositions. For instance, Japanese Patent Application Publication No. 2004-189933 describes a PSA composition in which a water-dispersed crosslinking agent containing oxazoline group is mixed in a water-dispersed copolymer of at least $100 \times 10^4$ in weight average molecular weight. Japanese Patent Application Publication No. H02-150482 describes a PSA composition containing a water-dispersed copolymer (I) of $20 \times 10^4$ to $80 \times 10^4$ in weight average molecular weight and a copolymer (II) of $20 \times 10^4$ to $80 \times 10^4$ in weight average molecular weight obtained by polymerizing a monomer component containing an addition-polymerizable oxazoline. Related art is described also in Japanese Patent Application Publications Nos. 2003-073637, H08-165464 and 2001-131511.

Various properties are required for a PSA depending on the purpose and application. One of such properties is an ability to hold an elastically-deformed flexible foam (typically in a sheet; i.e. a foam sheet) such as polyurethane foam against a repulsion force exerted by the foam to return to its original shape (that is, an ability to resist the repulsion force of the foam, which may be referred to as "foam repulsion resistance" below) when the foam is elastically deformed to conform surface contours (which may be curved, rough and so on) of an adherend. The foam repulsion resistance is especially important in, for example, a double-sided PSA sheet used for fixing a foam member to an adherend, PSA sheet having a foam substrate (support) and the like. For instance, it will be useful if one can provide a technology to increase foam repulsion resistance without significantly compromising other properties such as adhesiveness (pressure-sensitive adhesiveness), cohesive strength and so on; or a PSA sheet where this technology is applied.

An objective of the present invention is to provide a PSA sheet that is superior in foam repulsion resistance. Another objective of this invention is to provide a PSA sheet that exhibits, in addition to the foam repulsion resistance, high levels of other properties such as adhesiveness (pressure-sensitive adhesiveness), cohesive strength (especially, cohesive strength in a high temperature environment) and so on in a good balance. Another objective of this invention is to provide an aqueous acrylic PSA composition suitable for producing a PSA (typically a layer thereof) to be applied to form these PSA sheets. A related other objective is to provide a method for producing an aqueous PSA composition desirable for preparing such a PSA layer.

The present invention provides an aqueous (water-dispersed) PSA composition composed primarily of an acrylic polymer, wherein the acrylic polymer is dispersed in water. The acrylic polymer is obtained by polymerizing a starting monomer material composed primarily of an alkyl(meth)acrylate and further containing acrylic acid and methacrylic acid.

A PSA composition obtained from a starting monomer material containing both acrylic acid (AA) and methacrylic acid (MAA) may exhibit higher foam repulsion resistance as compared to a PSA composition obtained for instance from the starting monomer material with the same amount of AA substituted for MAA. Also, a PSA composition obtained from a starting monomer material containing both AA and MAA may exhibit higher foam repulsion resistance as compared to a PSA composition obtained from the stating monomer material with the same amount of MAA substituted for AA.

The mass ratio of acrylic acid to methacrylic acid (AA:MAA) contained in the starting monomer material is desirable to be, for instance, in a range between about 1:10 and 10:1 (preferably about 1:4 to 4:1). A PSA composition obtained from a starting monomer material having such a composition may show superior foam repulsion resistance.

In a preferred embodiment of the PSA composition disclosed herein, the acrylic polymer contained as a main component in the composition has a tetrahydrofuran(THF)-soluble portion of $65 \times 10^4$ to $100 \times 10^4$ in weight average molecular weight (Mw). The starting monomer material is preferred to further contain a silanol-forming monomer and to produce a polymer having an ethyl acetate-insoluble portion that amounts to a gel fraction (mass ratio) (Ga) of about 7% to 17% when the starfing monomer material is polymerized without the silanol-fonning monomer. The PSA composition is preferably composed so as to produce a post-crosslink PSA prepared therefrom having an ethyl acetate-insoluble portion that amounts to a gel fraction (mass ratio) (Gb) of about 20% to 55%.

A PSA composition that is composed primarily of an acrylic polymer obtained by polymerization (typically, emulsion polymerization) of a starting monomer material containing an alkyl(meth)acrylate as a main monomer and further containing either one of AA and MAA (for instance, only AA) as well as a silanol-forming monomer; and that also meets the requirements for Mw, Ga and Gb; may produce a high performance PSA (typically, a PSA layer) exhibiting high levels of the three properties of adhesiveness (peel strength etc.), cohesive strength in a high temperature environment (high-temperature cohesive strength) and edge peel resistance, which is described later, in a good balance. Applying to this PSA composition the embodiment of the present invention to include both AA and MAA in the starting monomer material enables production of a PSA (typically a PSA layer) of higher performance, which shows higher foam repulsion resistance while maintaining the three properties at high levels.

The gel fraction Ga (of the ethyl acetate-insoluble portion) is determined with a polymer obtained from the starting monomer material without the silanol-forming monomer (hereinafter, this polymer may be referred to as "reference polymer"). The polymerization to obtain a reference polymer is carried out under the same conditions as the polymerization of the starting monomer material to obtain an acrylic polymer to be used as the main component of the PSA composition other than that instead of the starting monomer material (starting monomer material for the acrylic polymer), a starting monomer material without a silanol-forming monomer (starting monomer material for reference polymer) is used. "The same conditions" here indicates that other than the presence (absence of a silanol-forming monomer, polymerization conditions (for instance, the temperature, time duration, type and amount of initiator used, type and amount of chain transfer agent used and so on) are the same.

The silanol-forming monomer can be a polymerizable compound having at least one (preferably two or more, for instance two or three) functional group (silanol-forming functional group) per molecule, which can be converted to the silanol group (Si—OH). A desirable example of the silanol-forming functional group is a functional group that forms silanol group by hydrolysis (alkoxysilyl group and the like). For instance, a silanol-forming monomer containing one, two or more alkoxysilyl groups of 1 to 4 carbon atom(s) per molecule (alkoxysilyl-group-containing monomer) is preferred.

In a preferred embodiment, the silanol-forming monomer is a dialkoxysilane (for instance, an alkyldialkoxysilane) or trialkoxysilane, having a (meth)acryloyl group. Each of the two or three alkoxy groups of the alkoxysilane may be one independently selected from methoxy group and ethoxy group. This kind of a silanol-forming monomer is readily co-polymerized with an alkyl(meth)acrylate and is highly crosslinkable; and thus is preferred. The co-polymerization amount of a silanol-forming monomer in the acrylic polymer can be, for instance, about 0.005 to 0.035 mass %.

The acrylic polymer may be obtained by subjecting the starting monomer material containing a silanol-forming monomer to emulsion polymerization along with a 0.025 to 0.035 part by mass of a chain transfer agent to 100 parts by mass of the starting monomer material. A composition containing this acrylic polymer can produce a PSA that exhibits the above properties at higher levels and a good balance.

Any of the PSA compositions disclosed herein can further contain a tackifier. The tackifier can be mixed in an amount in a range between about 5 to 40 parts by mass to 100 parts by mass of the acrylic polymer (based on the solid content after dried). A PSA composition having such a composition can produce a PSA that shows higher foam repulsion resistance (preferably, even adhesiveness, cohesive strength and edge peel resistance in a good balance); and a high performance PSA sheet having the same (typically a layer of the same).

The present invention provides a PSA sheet having a PSA layer formed from any of the PSA compositions disclosed herein. This sort of a PSA sheet may be of high performance showing excellent foam repulsion resistance (preferably, even adhesiveness, cohesive strength and edge peel resistance).

DETAILED DESCRIPTION OF THE INVENTION

Hereinafter, preferred embodiments of the present invention will be described. The matter which is other than that specifically referred to in this specification but is necessary for carrying out the present invention may be understood as a matter of design choice for those skilled in the art based on the conventional art. The present invention can be carried out based on the contents disclosed in this specification and the technological common knowledge in the art.

The acrylic polymer in the technology disclosed herein is obtained by polymerization (typically, emulsion polymerization) of a prescribed starting monomer material. The starting monomer material contains, as a main monomer (primary monomer component), an alkyl(meth)acrylate, i.e., (meth) acrylic acid ester of an alkyl alcohol. The "(meth)acrylic acid" here may refer to either or both of acrylic acid and methacrylic acid. When alkyl(meth)acrylate is contained as a main monomer, the alkyl(meth)acrylate content of the total starting monomer material (when two or more kinds of alkyl (meth)acrylate are contained, their combined content) exceeds 50 mass %. The alkyl(meth)acrylate content may be, for example, within a range from more than 50 mass % up to 99.8 mass % of the starting monomer material. The alkyl (meth)acrylate content of the starting monomer material is preferably 80 mass % or greater (typically about 80 to 99.8 mass %) and more preferably 85 mass % or greater (typically about 85 to 99.5 mass %). The alkyl(meth)acrylate content of the starting monomer material may be about 90 mass % or greater (typically about 90 to 99 mass %). This proportion roughly corresponds to the (co)polymerization ratio of the alkyl(meth)acrylate to the acrylic polymer obtained by polymerization of the starting monomer material.

The alkyl(meth)acrylate contained in the starting monomer material may be one, two or more selected from the compounds represented by the following chemical formula (1):

$$CH_2=C(R^1)COOR^2 \qquad (1)$$

wherein $R^1$ is either a hydrogen atom or methyl group and $R^2$ is an alkyl group of 1 to 20 carbon atoms. Examples of $R^2$ include methyl, ethyl, propyl, iso-propyl, butyl, iso-butyl, pentyl, iso-pentyl, hexyl, heptyl, 2-ethylhexyl, iso-octyl, iso-nonyl, iso-decyl groups and the like. Of these, an alkyl group of 2 to 14 carbon atoms (hereinafter, such a range of the number of carbon atoms may be denoted as "$C_{2-14}$") is preferred and a $C_{2-10}$ alkyl group (for instance, butyl, 2-ethylhexyl, or the like) is more preferred.

In a preferred embodiment of the total amount of the alkyl (meth)acrylate contained in the starting monomer material, (meth)acrylic acid ester of a $C_{2-10}$ (more preferably $C_{4-8}$)-alkyl alcohol amounts to 70 mass % or greater (more preferably 90 mass % or greater). Essentially all of the alkyl(meth) acrylates contained in the strting monomer material may be $C_{2-10}$-alkyl (more preferably $C_{4-8}$-alkyl) (meth)acrylates. For example, the starting monomer material may contain, as the alkyl(meth)acrylate(s), butyl acrylate alone, 2-ethylhexyl acrylate alone, or both butyl acrylate and 2-ethylhexyl acrylate in its composition. In a starting monomer material containing butyl acrylate and/or 2-ethylhexyl acrylate as the alkyl (meth)acrylate(s), the content ratio (mass ratio) of the butyl acrylate (BA) to 2-ethylhexyl acrylate (2EHA) may be, for example, BA/2EHA=0/100 to 100/0 (preferably 0/100 to 70/30, more preferably 5/95 to 60/40).

The stating monomer material contains acrylic acid (AA) and methacrylic acid (MAA) in addition to an alkyl(meth) acrylate, which is a main monomer. In other words, AA and MAA are copolymerized in the acrylic polymer, which is a primary component of the PSA composition disclosed herein. When the starting monomer material contains both AA and MAA as the ethylenic unsaturated monocarboxylic acid as described above (typically, a starting monomer material containing both AA and MAA for the carboxyl-group-containing monomer), the mass ratio of AA to MAA (AA:MAA) can be selected to be, for instance, within a range between 1:10 and 10:1, or preferably within a range between about 1:4 and 4:1 in general. To obtain greater high-temperature cohesive strength and foam repulsion resistance, the mass ratio of AA to MAA (AA:MAA) is preferably within a range of about 1:2 and 4:1 and for instance it can be within a range of about 1:1 and 3:1.

An example of a desirable composition of the starting monomer material contains a silanol-forming monomer in addition to an alkyl(meth)acrylate, AA and MAA. The silanol-forming monomer may contain a functional group that can introduce, to the PSA formed of the PSA composition, crosslinks by condensation reaction with the silanol group (silanol condensation). A preferred example of the silanol-forming monomer contains at least one (preferably two or more, for instance, two or three) alkoxysilyl group (alkoxysilyl group-containing monomer). In terms of copolymerization compatibility with an alkyl(meth)acrylate, a preferred silanol-forming monomer has, per molecule, one, two or more ethylenic unsaturated group such as acryloyl, methacryloyl (hereinafter, may be collectively referred to as "(meth) acryloyl" for both), vinyl and the like. An especially preferred silanol-forming monomer contains, per molecule, both (meth)acryloyl and alkoxysilyl groups (for instance, one (meth)acryloyl and two or three alkoxysilyl groups).

Examples of the silanol-forming monomer include 3-methacryloxypropyltrimethoxysilane, 3-acryloxypropyltrimethoxysilane, 3-methacryloxypropyltriethoxysilane, 3-acryloxypropyltriethoxysilane, 3-methacryloxypropylmethyldimethoxysilane, 3-acryloxypropylmethyldimethoxysilane, 3-methacryloxypropylmethyldiethoxysilane, 3-acryloxypropylmethyldiethoxysilane and the like. Other examples of the silanol-forming monomer include vinyltrimethoxysilane, vinyltriethoxysilane, 4-vinylbutyltrimethoxysilane, 4-vinylbutyltriethoxysilane, 8-vinyloctyltrimethoxysilane, 8-vinyloctyltriethoxysilane, 10-methacryloxydecyltrimethoxysilane, 10-acryloxydecyltrimethoxysilane, 10-methacryloxydecyltriethoxysilane, 10-acryloxydecyltriethoxysilane and the like. These silanol-forming monomer can be used alone or two or more kinds can be combined.

In an acrylic polymer wherein a silanol-forming monomer is copolymerized, the copolymerization ratio of the silanol-forming monomer to the acrylic polymer can be preferably selected so as to allow the gel fraction (Ga) of the reference polymer and the weight-average molecular weight (Mw) of the acrylic polymer to be each within its preferred range disclosed herein. In addition, the copolymerization ratio can be preferably selected so as to allow the gel fraction (Gb) of the post-crosslink PSA to be within the desired range disclosed herein. For instance, using the silanol-forming monomer in an amount of about 0.005 to 0.035 mass % (more preferably, about 0.01 to 0.03 mass %) to the total amount of the starting monomer material will bring about desired values for the Ga, Mw and Gb.

In addition to or instead of the silanol-forming monomer, which is a preferred optional component, the starting monomer material may contain other monomer(s) (copolymerization component). These "other monomer(s)" may be one, two or more selected form various monomers copolymerizable with the alkyl(meth)acrylates used here. For example, can be used various ethylenic unsaturated monomers having, per molecule, one, two or more of ethylenic unsaturated groups such as (meth)acryloyl, vinyl groups and the like Monomers that can be used as the "other monomers" include, for instance, ethylenic unsaturated monomers having various functional groups (hereinafter may be referred to as "functional group-containing monomers") as listed below.

Ethylenic unsaturated monomers having amino group such as N-alkylaminoalkyl(meth)acrylates including N-methylaminoethyl(meth)acrylate, N-ethylaminoethyl(meth)acrylate, N-t-butylaminoethyl(meth)acrylate and the like; N,N-dialkylaminoalkyl(meth)acrylates including N,N-dimethylaminoethyl(meth)acrylate, N,N-diethylaminoethyl (meth)acrylate and the like; and so on.

Ethylenic unsaturated monomers having hydroxyl group such as hydroxyalkyl(meth)acrylates including 2-hydroxyethyl(meth)acrylate, 2-hydroxypropyl(meth)acrylate, 3-hydroxypropyl(meth)acrylate, 2-hydroxybutyl(meth)acrylate and the like; vinyl alcohol; allyl alcohol; N-methylolacrylamide; and the like.

Ethylenically unsaturated monomers having keto group such as compounds having both (meth)acryloyl group and keto group (such as acetyl group) in a molecule such as diacetone (meth)acrylamide, diacetone (meth)acrylate, acetoacetoxymethyl(meth)acrylate, 2-(acetoacetoxy)ethyl (meth)acrylate (i.e., acetoacetic acid ester of 2-hydroxyethyl (meth)acrylate), 2-acetoacetoxypropyl(meth)acrylate, butanediol-1,4-acrylate-acetylacetate (i.e., acrylic acid/acetoacetic acid diester of 1,4-butanediol); vinyl alkyl ketones (e.g., vinyl-$C_{1-7}$ alkyl ketones) such as vinylmethylketone, vinylethylketone, and vinylisobutylketone and the like; and allyl acetoacetate, vinyl acetoacetate, vinyl acetoacetamido, and the like.

Ethylenic unsaturated monomers having amide group such as (meth)acrylamide, N,N-dimethyl(meth)acrylamide, N-methoxymethyl(meth)acrylamide, N-butoxymethyl (meth)acrylamide and the like.

Ethylenic unsaturated monomers having epoxy group such as glycidyl(meth)acrylate, allylglycidyl ether and the like.

Ethylenic unsaturated monomers having carboxyl group other than AA and MAA, including ethylenic unsaturated monocarboxylic acids such as crotonic acid and the like; ethylenic unsaturated dicarboxylic acids such as maleic acid, itaconic acid, citaonic acid and the like as well as anhydrides thereof.

When the starting monomer material contains such a functional group-containing monomer, the amount of the functional group-containing monomer (in the case where two or more types of functional group-containing monomers are included, the total amount thereof) can be, for example, about 12 parts by mass or less (typically, about 0.1 to 12 parts by mass) to 100 parts by mass of alkyl(meth)acrylate. This ratio may be about 8 parts by mass or less (typically, about 0.1 to 8 parts by mass) to 100 parts by mass of alkyl(meth)acrylate.

Alternatively, the starting monomer material may contain essentially none of the functional-group-containing monomer.

The functional group-containing monomer can be used as a component of the starting monomer material along with the alkyl(meth)acrylate, AA and MAA (and also an optional silanol-forming monomer) to provide crosslinking points to the resulting acrylic polymer. That is, the functional group (crosslinkable functional group) can serve as a crosslinking point involved in a crosslinking reaction (typically, thermal crosslinking reaction) with a functional group contained in a crosslinking agent mixed with the acrylic polymer and/or a functional group contained in the acrylic polymer. The crosslinkable functional group(s) can be introduced to the acrylic polymer by copolymerizing monomers of the same or different functional groups. Thus, the type and amount (copolymerization ratio) of the functional group-containing monomer can be selected in accordance with the type and amount of the crosslinking agent to be used, the nature of the crosslinking reaction, the desired degree of crosslinking (crosslinking density) and so on. For example, the type and the amount (copolymerization ratio) can be selected so as to allow the gel fraction (Ga) of the reference polymer to be within the preferred range disclosed herein. The type and amount (copolymerization ratio) can be chosen so as to allow the gel fraction (Gb) of the post-crosslink PSA to be within the preferred range disclosed herein.

Further examples of the "other monomers" mentioned above include multi-functional (meth)acrylates, namely, ethylenic unsaturated monomers having two or more (meth)acryloyl groups in the molecule, such as ethyleneglycol di(meth)acrylate, dipropyleneglycol di(meth)acrylate, hexanediol di(meth)acrylate, neopentylglycol di(meth)acrylate, trimethylolpropane tri(meth)acrylate, tetramethylolmethane tri(meth)acrylate, dipentaerythritol hexa(meth)acrylate and the like. These multi-functional (meth)acrylates can be used as a component of the starting monomer material along with the alkyl(meth)acrylate as the main monomer to introduce branches or crosslinks to the resulting acrylic polymer. In a starting monomer material containing a multifunctional (meth)acrylate, the ratio of the multifunctional (meth)acrylate may be, for example, about 10 parts by mass or less to 100 parts by mass of the alkyl(meth)acrylate. The ratio may be about 5 parts by mass or less to 100 parts by mass of alkyl (meth)acrylate. Whether or not a multi-functional (meth) acrylate is used; and when used, the type and amount thereof to be used can be decided, for example, so as to allow both the Ga and Mw to be within the preferred ranges disclosed herein. The starting monomer material may contain essentially no multi-functional group-containing (meth)acrylates.

Further more examples of monomers usable as the "other monomers" mentioned above include ethylenic unsaturated monomers such as, vinyl esters including vinyl acetate, vinyl propionate and the like; aromatic vinyl compounds including styrene, α-methylstyrene, vinyltoluene and the like; (meth) acrylic acid esters of cyclic alcohols including cyclopentyl (meth)acrylate, cyclohexyl(meth)acrylate, isobornyl(meth) acrylate and the like; (meth)acrylonitrile; N-meth) acryloylmorpholine; N-vinyl-2-pyrrolidone; and the like. The amount of the monomer to be used (in case where two or more types of monomers are contained, their combined amount) may be, for example, about 10 parts by mass or less to 100 parts by mass of the alkyl(meth)acrylate. The ratio may be about 5 parts by mass or less to 100 parts by mass of the alkyl(meth)acrylate. The stating monomer material may contain essentially no such monomers.

The acrylic polymer as a primary component of the PSA composition in the technology disclosed herein is obtained by polymerization (typically, emulsion polymerization) of a starting monomer material that contains both AA and MAA as described above and optionally a silanol-forming monomer. The acrylic polymer contains a THF-insoluble portion preferably having a weight average molecular weight (may be simply referred to as "average molecular weight" below) within a range from at least $65 \times 10^4$ up to $100 \times 10^4$. A PSA or a PSA sheet formed of a PSA composition composed primarily of an acrylic polymer that meets the average molecular weight requirement exhibits high levels of foam repulsion resistance, adhesive strength (peel strength) and high-temperature cohesive strength (preferably, even edge peel resistance) in a good balance.

The average molecular weight (Mw) is determined by the following procedures:

Procedures for determining Average Molecular Weight

A sample of acrylic polymer is suspended in THF at room temperature (typically 23° C.) for 7 days to extract the THF-soluble portion. The remaining THF-insoluble residue is removed by filtration and the filtrate is either concentrated or diluted (can be re-dissolved in THF after dried once) to prepare a THF solution of the THF-soluble residue at an appropriate concentration (for example, about 0.1 to 0.3 mass %. 0.2 mass % in the examples below). The THF solution is run through a filter with an average pore diameter of 0.45 μm and the filtrate (sample solution for molecular weight measurement) is used to determine the average molecular weight (Nw) of the THF-soluble portion based on standard polystyrene using a gel permeation chromatography (GPC) system. For the GPC system, for instance, a system named "HLC-8120GPC" (TSKgel GMH-H(S) column) available from Tosoh Corporation can be used. For the sample used in the measurement, for example, an aqueous emulsion of the acrylic polymer dried at 130° C. for 2 hours is suitable.

When the acrylic polymer as a primary component of the PSA composition in the technology disclosed herein is obtained by polymerization (emulsion polymerization) of a starting monomer material containing a silanol-forming monomer, the mass fraction of the ethyl acetate-insoluble portion of the reference polymer (hereinafter, it may be referred to as "gel fraction of reference polymer") (Ga) is preferred to be about 7% to 17% (for instance, about 10% to 17%). A PSA or a PSA sheet formed of a PSA composition composed primarily of this acrylic polymer (i.e., an acrylic polymer obtained by polymerizing the starting monomer material containing a silanol-forming monomer under the same conditions) can exhibit foam repulsion resistance, adhesive strength and high-temperature cohesive strength (preferably, even edge peel resistance) at high levels and a good balance.

The "gel fraction (Ga) of reference polymer" is determined by the following procedures:

Procedures for Determining Gel Fraction of Reference Polymer (Ga)

A sample of about 0.1 g reference polymer (mass: $W_{a1}$ mg) is placed on a porous membrane of polytetrafluoroethylene (mass: $W_{a2}$ mg) with an average pore diameter of 0.2 μm, and the membrane with the sample is tied with a strand of cotton yarn (mass: $W_{a3}$ mg) to form a bag. This bag is placed into a screw tube of 50 mL volume (one screw tube for one bag), and the screw tube is filled with ethyl acetate. This is left at room temperature (typically, at 23° C.) for 7 days, and then the bag is removed from the screw tube and dried at 130° C. for 2 hours. Then, the mass of the bag ($W_{a4}$ mg) is measured. The gel fraction (Ga) of the polymer is obtained by substituting each value into the following expression:

$$Ga[\%]=[(W_{a4}-W_{a2}-W_{a3})W_{a1}]\times 100$$

A desirable polytetrefluoroethylene (PTFE) porous membrane is trade name "Nitoflon (registered trademark) NTF1122" available from Nitto Denko Corporation (0.2 μm average pore diameter, 75% porosity, 0.085 mm thickness) or an equivalent thereof. For the sample of the measurement, can be used, for example, an aqueous emulsion of the reference polymer (typically an aqueous emulsion of the polymer obtained by emulsion polymerization of the starting monomer material without the silanol-forming monomer) after dried at 130° C. for 2 hours.

The PSA composition disclosed herein can be obtained by subjecting the starting monomer material to emulsion polymerization. The embodiment of the emulsion polymerization is not especially limited and can be carried out following general emulsion polymerization procedures such as various conventional methods to supply monomers under appropriate polymerization conditions (temperature, time, applied pressure, and so on) with appropriate compounds (polymerization initiator, surfactant etc.). For instance, the monomers can be added to the reaction vessel, all in one portion, gradually (dropwise), or in divided portions (dropwise). All or a part of the starting monomer material can be emulsified with water and the resulting emulsion can be added to the reaction vessel.

The polymerization can be carried out at a temperature of, for example, about 20 to 100° C. (typically, 40 to 80° C.). Examples of a polymerization initiator include, but not limited to, for example, azo initiators such as 2,2'-azobisisobutylonitrle, 2,2'-azobis(2-methylpropionamidine)disulfate, 2,2'-azobis(2-amidinopropane)dihydrochloride, 2,2'-azobis[2-(5-methyl-2-imidazoline-2-yl)propane]dihydrochloride, 2,2'-azobis(N,N'-dimethyleneisobutylamidine), 2,2'-azobis[N-(2-carboxyethyl)-2-methylpropionamidine]hydrate and the like; persulfate salts such as potassium persulfate, ammonium persulfates and the like; peroxide initiators such as benzoylperoxide, t-butyl hydroperoxide, hydrogen peroxide and the like; substituted ethane initiators such as phenyl-substituted ethane and the like; and redox initiators such as a combination of persulfate and sodium hydrogen sulfite, a combination of peroxide and sodium ascorbate, and the like. The amount of the polymerization initiator may be, for example, 0.005 to 1 part by mass to 100 parts by mass of the starting monomer material. The polymerization initiator can be supplied gradually, in divided portions, or all in one portion by placing essentially all of the initiator in the reaction vessel before adding the starting monomer material (typically, an aqueous solution of the initiator is prepared in the reaction vessel). For ease of operations, process management and such, it is preferred to be supplied all in one portion.

Examples of an emulsifier (surfactant) include anionic emulsifiers such as sodium laurylsulfate, ammonium laurylsulfate, sodium dodecylbenzenesulfonate, sodium polyoxyethylenealkylethersulfate, ammonium polyoxyethylenealkylphenylethersulfate, sodium polyoxyethylenealkylphenylethersulfate and the like; and nonionic emulsifiers such as polyoxyethylenealkylether, polyoxyethylenealkylphenylether and the like. One, or a combination of two or more, of these emulsifiers may be used. The applied amount of emulsifier may be, for example, about 0.2 to 10 parts by mass (preferably, about 0.5 to 5 parts by mass) to 100 parts by mass of the starting monomer material.

For the polymerization (typically emulsion polymerization), various conventional chain transfer agents (also known as molecular weight adjusting agents or polymerization-degree adjusting agents) may be used as necessary. For example, one, two or more chain transfer agents can be used, selected from mercaptans such as dodecyl mercaptan (dodecanethiol), glycidyl mercaptan, 2-mercaptoethanol, mercaptoacetic acid, 2-ethylhexyl thioglycolate, 2,3-dimercapto-1-propanol and the like. Among these, dodecanethiol is preferred. The chain transfer agent may be used in an amount of, for example, about 0.001 to 0.5 parts by mass to 100 parts by mass of the starting monomer material. The amount may be about 0.02 to 0.05 parts by mass. For instance, when a chain transfer agent is used in an amount of 0.025 to 0.035 parts by mass, good results can be obtained.

The embodiment of the emulsion polymerization can be set so as to allow the Mw (preferably, both the Mw and Ga when a starting monomer material containing a silanol-forming monomer is used) to be within the preferred range disclosed herein. Means to adjust the values (Mw, Ga) are not particularly limited. For example, various parameters known to affect the polymerization degree (molecular weight) or molecular structure can be appropriately set to adjust the Mw and/or Ga. Examples of the parameters used for the adjustment of these values include, the presence/absence of a chain transfer agent, parameters related to the chain transfer agent when used such as the type (the compound used), amount, when to be added to the reaction vessel and so on; parameters related to the polymerization initiator such as the type (compound used), amount, supply mode (in one portion, gradually, in divided portions etc.) and so on; parameters related to the starting monomer material such as the kinds and composition of monomers (for example, presence/absence of a functional group-containing monomer, and when present, the kind and mass ratio thereof to the total amount of the starting monomer material), supply mode (in one portion, gradually, in divided portions etc.), the addition rate when added gradually and so on; polymerization temperature, polymerization time, the solid content of the aqueous emulsion obtained by the polymerization etc. General trends in the effects of these parameters on Mw or Ga can be understood as technological common knowledge of those in the field or easily understood by conducting simple preliminary experiments. The emulsion polymerization can be carried out in an embodiment (polymerization conditions) in accordance with the technological common knowledge and/or results of preliminary experiments to adjust the values (Mw, Ga.) to be within the preferred ranges.

The aqueous PSA composition disclosed herein is composed primarily of an acrylic polymer as described above, wherein the acrylic polymer is dispersed in water. The composition can be said to be "composed primarily of an acrylic polymer" when the amount of the acrylic polymer contained in the non-volatile content (solid content) of the composition exceeds 50 mass %. A composition with more than 70 mass % in this amount can be used as well. The amount of the non-volatiles (solid content) in the aqueous PSA composition can be in a range of, for instance, about 30 to 80 mass % (typically about 40 to 70 mass %)

The PSA composition disclosed herein may contain as needed an adequate amount of an appropriate crosslinking agent mixed with the aqueous emulsion of the acrylic polymer. As for the crosslinking agent, various crosslinking agents generally known in the field of the aqueous PSA compositions (typically, containing as an active ingredient a crosslinkable compound having per molecule two or more crosslinkable functional group reactive toward the functional group of the acrylic polymer) such as carbodiimide-based crosslinking agents, hydrazine-based crosslinking agents, isocyanate-based crosslinking agents, epoxy-based crosslinking agents, oxazoline-based crosslinking agents, aziridine-based crosslinking agents, metal chelate-based crosslinking agents, silane coupling agents and the like can be used without particular limitations. Either a water-soluble or an oil-soluble crosslinking agent can be used. One or a combination of two or more of these crosslinking agents can be used. Alternatively, the PSA composition may contain none of these crosslinking agents. For instance, for a PSA composition prepared with a starting monomer material containing a silanol-forming monomer, the embodiment in which no crosslinking agent is mixed may be preferred.

The PSA composition disclosed herein can be dried and crosslinked (typically, thermally crosslinked) by conventional methods to obtain a PSA (post-crosslink PSA). The composition is preferably composed so as to allow the gel fraction (Gb) of the post-crosslink PSA (hereinafter, may be referred to as the "gel fraction of PSA") to be about 20% to 55%. The Gb can be 30% to 55% (for instance, about 35% to 55%) A PSA composition obtained by using a starting monomer material containing a silanol-forming monomer in addition to AA and MAA has a Gb of preferably about 20% to 45% and of more preferably about 25% to 40% (for instance, about 30% to 40%).

The "gel fraction (Gb) of PSA" is determined by the following procedures:

Procedures for Determining Gel Fraction of PSA (Gb)

The PSA composition is applied (typically by coating) to a release liner. This is dried at 100° C. for 2 minutes to form a PSA layer of about 50 μm to 100 μm thickness on the release liner and stored further at 50° C. for 3 days. A sample of about 0.1 g PSA (mass: $W_{b1}$ mg) is removed from the PSA layer and placed on a porous membrane of PTFE (mass: $W_{b2}$ mg) with an average pore diameter of 0.2 μm and the membrane containing the sample is tied with a stand of cotton yarn (mass: $W_{b3}$ mg) to form a bag. This bag is placed into a screw tube of 50 mL volume (one screw tube for one bag), and the screw tube is filled with ethyl acetate. This is left at room temperature (typically, at 23° C.) for 7 days, and then the bag is removed from the screw tube and dried at 130° C. for 2 hours. Then, the mass of the bag ($W_{b4}$ mg) is measured. The gel fraction of PSA (Gb) is obtained by substituting each value into the following expression.

$$Gb[\%]=[(W_{b4}-W_{b2}-W_{b3})/W_{b1}]\times 100$$

A desirable PTFE porous membrane is trade name "Nitoflon (registered trademark) NTF1122" mentioned above or an equivalent thereof.

It is preferable to select the copolymerization composition of the acrylic polymer, whether or not a crosslinking agent is added to the polymer, when added the kind and amount of a crosslinking agent and the like so as to allow the gel fraction (Gb) to be within the preferred range disclosed herein. For example, when a silanol-forming monomer is used, by using a silanol-forming monomer in an amount within the preferred range with respect to the amount of the starting monomer material, a PSA composition having a preferred Gb will be obtained.

With respect to the PSA composition obtained from a starting monomer material containing a silanol-forming monomer, the acrylic polymer as a main component thereof (i.e., an acrylic polymer wherein a silanol-forming monomer is copolymerized) has a gel fraction (Gc) of the ethyl acetate-insoluble portion (hereinafter, may be referred to as the "gel fraction of acrylic polymer") preferably in a range of about 20% to 55% and more preferably in a range of about 35% to 45% when determined as described below. A PSA composition composed primarily of an acrylic polymer that meets the Gc requirement can provide a PSA that exhibits the four properties of adhesiveness, high-temperature cohesive strength, edge peel resistance and foam repulsion resistance at high levels and a good balance.

Procedures for Determining Gel Fraction of Acrylic Polymer (Gc)

A sample of about 0.1 g acrylic polymer (mass: $Wc_1$ mg) is placed on a porous membrane of PTFE (mass: $Wc_2$ mg) with an average pore diameter of 0.2 μm and the membrane containing the sample is tied with a strand of cotton yarn (mass: $Wc_3$ mg). This bag is placed into a screw tube of 50 mL volume (one screw tube for one bag), and the screw tube is filled with ethyl acetate. This is left at room temperature (typically, at 23° C.) for 7 days, and then the bag is removed from the screw tube and dried at 130° C. for 2 hours. Then, the mass of the bag ($Wc_4$ mg) is measured. The gel fraction (Gc) of the acrylic polymer is obtained by substituting each value into the following expression.

$$Gc[\%]=[(Wc_4-Wc_2-Wc_3)/Wc_1]\times 100$$

A desirable PTFE porous membrane is trade name "Nitoflon (registered trademark) NTF1122" mentioned above or an equivalent thereof. For the sample of the measurement, can be used, for example, an aqueous emulsion of the acrylic polymer after dried at 130° C. for 2 hours.

Though not particularly limited to, the THF-soluble portion of the post-crosslink PSA may have a weight average molecular weight (Mx) of, for example, about $10\times 10^4$ to $80\times 10^4$ (preferably about $20\times 10^4$ to $60\times 10^4$) based on standard polystyrene. The Mx can be determined in the same way as the weight average molecular weight (Mw) of the THF-soluble portion of the acrylic polymer. When the Mx is exceedingly lower than this range, the PSA or the PSA sheet thereof may lack a good balance of adhesiveness (pressure-sensitive adhesiveness, for instance peel strength), high-temperature cohesive strength and edge peel resistance. For instance, the high-temperature cohesive strength tends to be insufficient. On the other hand, when the Mx is exceedingly higher than this range, the initial adhesive strength and tack (stickiness) tend to decrease. The Mx can be adjusted for example by varying parameters such as the presence/absence of a chain transfer agent during the production of the acrylic polymer, the kind (compound used) and amount thereof when present, the type of the silanol-forming monomer and mass ratio thereof to the total starting monomer material, presence/absence of a functional group-containing monomer and the kind and ratio thereof to the total starting monomer material and so on.

In a preferred embodiment of the PSA composition disclosed herein, the composition further contains a tackifier. One, two or more tackifiers may be used, selected from various tackifier resins such as rosin-based resins, rosin derivative resins, petroleum-based resins, terpene-based resins, phenol-based resins, ketone-based resins and the like. Examples of rosin-based resins include, rosins such as gum rosin, wood rosin, tall-oil rosin and the like, stabilized rosins (for example, stabilized rosins obtained by subjecting any of the above-mentioned rosins to disproportionation or hydrogenation), polymerized rosins (for example, a multimer of any of the above-mentioned rosins, typically, a dimer thereof), modified rosins (for example, unsaturated acid-modified rosins modified by unsaturated acids such as maleic acid, fumaric acid, (meth)acrylic acid and the like), and the like. Examples of rosin derivative resins include, esterified compounds of the above-mentioned rosin-based resins, phenol modified compounds and esterified compounds thereof, and the like. Examples of petroleum-based resins include, aliphatic petroleum resins, aromatic petroleum resins, copolymeric petroleum resins, alicyclic petroleum resins, hydrides thereof, and the like. Examples of terpene-based resins include, α-pinene resins, β-pinene resins, aromatic modified terpene-based resins, terpenephenol-based resins, and the like. Examples of ketone-based resins include, ketone-based resins obtained by condensation of ketones (for example, aliphatic ketones such as methylethylketone, methylisobutylketone, acetophenone and the like; alicyclic ketones such as cyclohexanone, methylcyclohexanone and the like) and formaldehyde.

To increase the cohesive strength in a high-temperature environment, a tackifier having a softening point of about 140° C. or higher (typically, 140 to 180° C.) can be preferably used. Examples of commercially available tackifiers having a softening point within this range include, but not limited to, trade names "Super Ester E-865", "Super Ester E-865NT", "Super Ester E-650", "Super Ester E-786-60", "Tamanol E-100", "Tamanol E-200", "Tamanol 803L", "Pensel D-160" and "Pensel KK" available from Arakawa Chemical Industries, Ltd.; trade names "YS polyster S", "YS Polyster T" and "Mightyace G" available from Yasuhara Chemical Co., Ltd.; and the like. When a tackifier having a softening point of about 160° C. or higher (typically, 160 to 180° C.) is used, can be obtained a PSA composition that provides a PSA layer of higher performance. For example, can be provided a PSA composition with high levels of cohesive strength in a high-temperature environment and other properties (peel strength, edge peel resistance, etc.) in a good balance. One or a combination of two or more of these tackifiers may be used.

Tackifier is typically added to an aqueous emulsion of the acrylic polymer. There is no specific limitation to the addition mode of tackifier. Usually, it is appropriate to add tackifier as a water dispersion (a tackifier emulsion) in which the tackifier is dispersed in water.

The blend ratio of the tackifier may be, for example, about 50 parts by mass or less to 100 parts by mass of the acrylic polymer based on the non-volatiles (solid content). Usually, it is suitable that the ratio be 40 parts by mass or less. There is no specific lower limit to the blend ratio of the tackifier, but it is usually 1 part by mass or greater to 100 parts by mass of the acrylic polymer for a better result. In one preferred embodiment of the PSA composition disclosed herein, the blend ratio (content) of the tackifier is about 5 to 40 parts by mass (typically about 5 to 30 parts by mass, for instance 15 to 30 parts by mass) to 100 parts by mass of the acrylic polymer, based on the solid content. With a PSA composition containing a tackifier at a ratio within this range, the PSA crosslinked to have a Gb in the preferred range or a PSA sheet provided with this PSA can exhibit, in addition to excellent foam repulsion resistance, a plurality of properties of adhesiveness (peel strength) and high-temperature cohesive strength (preferably edge peel resistance as well) at high levels and a good balance.

The PSA composition disclosed herein may optionally contain a polymer component other than the acrylic polymer. This polymer component preferably has the property of rubber or elastomer. Examples of this polymer component include, ethylene-vinyl acetate copolymer, acrylic rubber, natural rubber (NR), isoprene rubber (IR), styrene butadiene rubber (SBR), chloroprene rubber (CR), butyl rubber (IIR), ethylene propylene rubber (EPM, EPDM), polyisobutylene, styrene-ethylene-butylene-styrene copolymer (SEBS), acrylonitrile-butadiene copolymer (NBR), styrene-butadiene-styrene block copolymer (SBS), styrene-isoprene-styrene block copolymer (SIS), polyvinyl alkyl ether (for example, polyvinyl isobutyl ether), and the like. One or a combination of two or more of these may be used.

This polymer component may be used, for example, as an emulsion where the polymer component is dispersed in water, by mixing in an aqueous emulsion of the acrylic polymer. It is appropriate that the amount (blend ratio) of the polymer component is about 50 parts by mass or less (for example, 5 to 50 parts by mass) to 100 parts by mass of the acrylic polymer based on the non-volatiles (solid content). The ratio may be 5 parts by mass or less. The PSA composition may contain essentially none of this polymer component.

The PSA composition disclosed herein may contain an acid or a base (aqueous ammonia or the like) to adjust the pH value or the like. Other optional components that may be contained in the composition are, for example, various additives generally used in the field of aqueous PSA compositions such as viscosity modifier, leveling agent, plasticizer, filler, colorant such as pigment, dye or the like, stabilizer, preservative, anti-aging agent and the like. As such additives, conventionally known additives may be used in a usual manner. These additives do not provide any specific feature to the present invention and thus a detailed description is omitted.

The PSA sheet according to the present invention includes a PSA layer formed using one of the PSA compositions disclosed herein. The PSA sheet may have this PSA layer on either one side or both sides of a substrate sheet (support); or may have this PSA layer on a release liner. The concept of the PSA sheet herein encompasses PSA tapes, PSA labels, PSA films and the like. The form of the PSA layer is not limited to be continuous and may have a regular or random pattern such as dots, stripes and so on.

Figure 1:
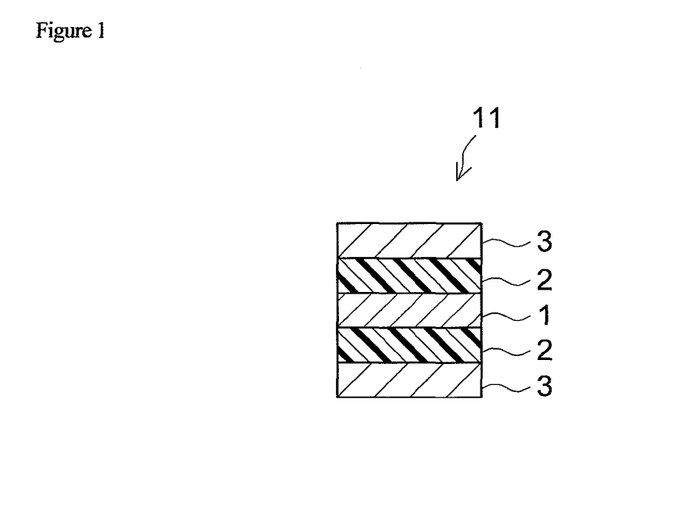
FIG. 1 shows a cross section schematically illustrating an example of a configuration of the PSA sheet of the present invention.
Figure 2:
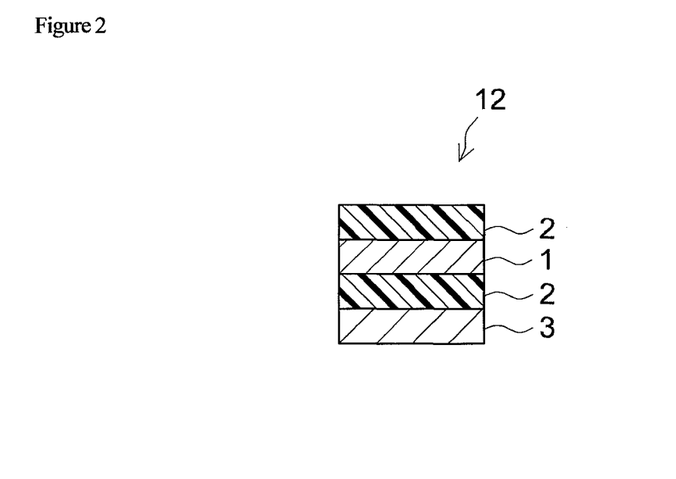
FIG. 2 shows a cross section schematically illustrating another example of a configuration of the PSA sheet of the present invention.

The PSA sheet disclosed herein may have, for example, a cross section schematically shown in one of FIGS. 1 to 6. Of these, FIGS. 1 and 2 show examples of a configuration of a double-sided PSA sheet with a substrate. A PSA sheet 11 shown in FIG. 1 has PSA layers 2 on both sides of a substrate 1 and these PSA layers 2 are protected each by a release liner 3 of which at least the surface to contact the PSA layer is releasable. A PSA sheet 12 shown in FIG. 2 has PSA layers 2 on both sides of a substrate 1 and one of these PSA layers is protected by a release liner 3 of which both surfaces are releasable. The PSA sheet 12 in this configuration can be rolled up to bring the unprotected PSA layer into contact with the back side of the release liner 3 to protect the PSA layer with the same.

Figure 3:
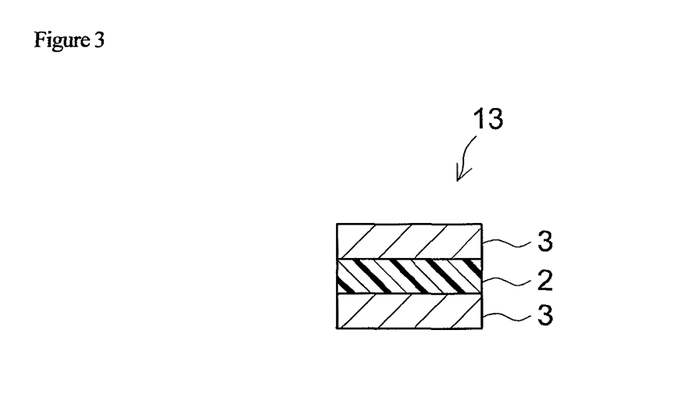
FIG. 3 shows a cross section schematically illustrating another example of a configuration of the PSA sheet of the present invention.
Figure 4:
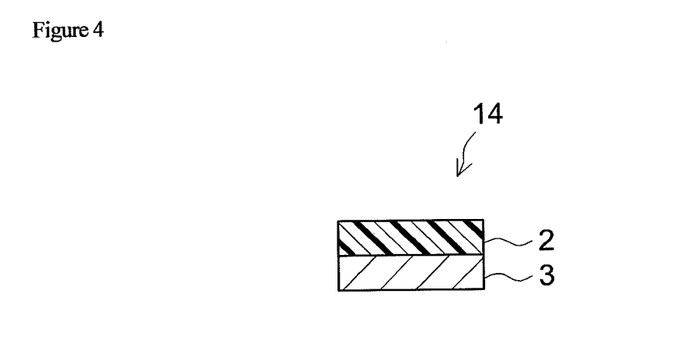
FIG. 4 shows a cross section schematically illustrating another example of a configuration of the PSA sheet of the present invention.

FIGS. 3 and 4 illustrate examples of a configuration of a substrate-free PSA tape. A PSA sheet 13 shown in FIG. 3 has a substrate-free PSA layer 2 with both sides protected by release liners 3, the liner having a release surface on at least the side to cover the PSA layer. A PSA sheet 14 shown in FIG. 4 has a substrate-free PSA layer 2 with a first side protected by a release liner 3, which is releasable on the both sides. By rolling this up, a second side of the PSA layer 2 comes in contact with the release liner 3 and is protected by the same.

Figure 5:
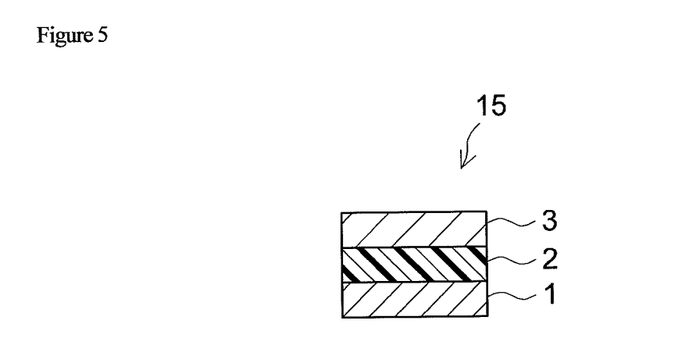
FIG. 5 shows a cross section schematically illustrating another example of a configuration of the PSA sheet of the present invention.
Figure 6:
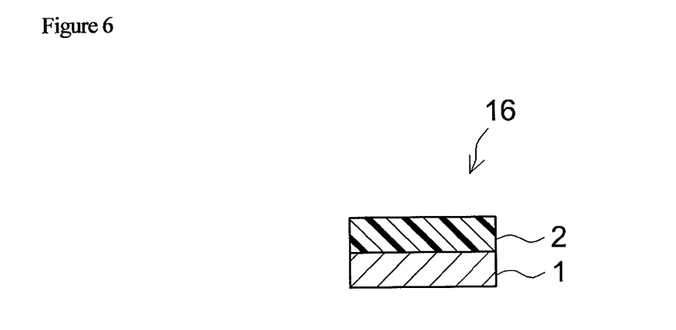
FIG. 6 shows a cross section schematically illustrating another example of a configuration of the PSA sheet of the present invention.

FIGS. 5 and 6 show examples of a configuration of a single-sided PSA sheet with a substrate. A PSA sheet 15 shown in FIG. 5 has a PSA layer 2 on a first side of a substrate 1 and the surface (adhesive face) of the PSA layer 2 is protected by a release liner 3, which is releasable on at least the side to cover the PSA layer. A PSA sheet 16 shown in FIG. 6 has a PSA layer 2 on a first side of a substrate 1. A second side of the substrate 1 is releasable and by rolling up the PSA sheet 16 the PSA layer 2 comes in contact with the second side so that the surface (adhesive face) of the PSA layer is protected by the second side of the substrate 1.

For the substrate to constitute these PSA sheets, can be used any one appropriately selected based on the application of the PSA sheet from: plastic films such as polypropylene film, ethylene-propylene copolymer film, polyester film, polyvinyl chloride film, and the like; foam substrates such as polyurethane foam, polyethylene foam and the like; paper such as kraft paper, crepe paper, Japanese paper ("washi"), and the like; fabrics such as cotton cloth, staple-fiber cloth and the like; unwoven cloth such as polyester unwoven cloth, vinylon unwoven cloth; and metal foils such as aluminum foil, copper foil and the like. The plastic film may be either unstretched or stretched (uniaxially or biaxially stretched). The substrate may be treated by application of a primer coating, corona discharge or the like on the side to which a PSA layer is provided. The thickness of the substrate can be appropriately selected in accordance with the application purpose, but is generally about 10 µm to 500 µm (typically, 10 µm to 200 µm).

The PSA layer, for instance, may be formed by applying (typically by coating) to a substrate or release liner any aqueous PSA composition disclosed herein and allowing the applied composition to dry. Coating of the PSA composition can be carried out with, for example, a conventional coater such as gravure roll coater, reverse roll coater, kiss roll coater, dip roll coater, bar coater, knife coater, spray coater and the like. The thickness of the coated PSA composition is not particularly limited, but can be about 2 µm to 150 µm (typically, about 5 µm to 100 µm) after dried. To promote the crosslinking reaction and improve the productivity, the PSA composition is preferred to be dried with heating. Although it may be varied depending on the type of the substrate, the drying temperature may be, for example, about 40° C. to 120° C. For a PSA sheet with a substrate, the PSA composition may be directly applied to the substrate to form a PSA layer, or a PSA layer formed on a release liner may be transferred to the substrate.

The PSA sheet provided by the present invention shows excellent foam repulsion resistance. Preferably, the PSA sheet is of high performance further exhibiting simultaneously high levels of adhesiveness (peel strength etc.), cohesive strength (especially in a high temperature environment) and edge peel resistance (adhesiveness to curved surfaces). Foam repulsion resistance is a property that may indicate the adhesiveness of a PSA sheet to rough surfaces (ability to maintain adhesion while conforming surface contours of an adherend) and can be evaluated by the foam repulsion resistance test described later for example. The cohesive strength in a high-temperature environment can be analyzed for instance by measuring a holding strength (heat resistant holding strength) at 80° C. as described later. The edge peel resistance is a property that can be used for assessing the ability of the PSA sheet to adhere to a curved surface (adhesiveness following surface contours of an adherend). It can be evaluated for example by the edge peel resistance test described later.

Reasons for these excellent results are not necessarily identified, but, for instance, can be assumed as follows. By using both AA and MAA for the starting monomer material, the foam repulsion resistance can be substantially increased while suppressing decreases in other properties; thus, for example, as compared to a PSA composition that is composed primarily of an acrylic polymer obtained by polymerizing a starting monomer material containing only one of AA and MAA and that can be used to prepare a PSA that shows excellent adhesiveness and high-temperature cohesive strength, by using a composition (composition of the starting monomer material) containing AA and MAA, the foam repulsion resistance can be increased while maintaining the adhesiveness and high-temperature cohesive strength at high levels.

With a PSA composition that is primarily composed of an acrylic polymer obtained by polymerizing a starting monomer material containing an alkyl(meth)acrylate as the main monomer and a silanol-forming monomer and further containing only one of AA and MAA (for instance, only AA); and that meets the requirements for the Mw, Ga and Gb; can be obtained a PSA that exhibits high levels of the three properties of adhesiveness, high-temperature cohesive strength and edge peel resistance in a good balance. The gel fraction (Ga) of the reference polymer significantly affects the edge peel resistance of the PSA or PSA sheet obtained from the PSA composition. The average molecular weight (Mw) of the acrylic polymer and the gel fraction (Gb) of the post-crosslink PSA greatly affect the high-temperature cohesive strength and edge peel resistance. With a PSA composition that satisfies all the requirements for Ga, Mw and Gb, the high-temperature cohesive strength and edge peel resistance can be increased while maintaining the desired adhesiveness By applying the composition that contains both AA and MAA to this PSA composition, the foam repulsion resistance can be increased while maintaining the three properties at high levels.

EXAMPLES

Hereinafter, some examples according to the present invention will be described, but the present invention is not limited to these examples. In the following description, the terms "part(s)" and "%" are based on mass unless otherwise specified.

The weight average molecular weight Mw of the THF-soluble portion of an acrylic polymer was determined based on standard polystyrene with a sample solution prepared for molecular weight measurement by the method described above, using a gel permeation chromatography (GPC) system available from Tosoh Corporation, model name HLC-8120GPC, under the following conditions:

[GPC Measuring Conditions]
Amount of sample solution injected: 10 µL (THF solution at a concentration of 0.2% by mass)
Eluant: THF
Flow rate: 0.6 mL/min.
Measuring temperature: 40° C.
Column: TSKgel GMH-H(S)
Detector: Differential refractive index detector Example 1

To a reaction vessel equipped with a condenser, nitrogen inlet, thermometer and stirrer, were placed 0.1 part 2,2'-azobis[N-(2-carboxyethyl)-2-methylpropionamidine]hydrate (polymerization initiator) (trade name "VA-057" available from Wako Pure Chemical Industries, Ltd.) and 35 parts ion-exchanged water, and the resulting mixture was stirred for one hour under nitrogen flow. To this kept at 60° C., was added dropwise over 3 hours an emulsion (an emulsion of the starting monomer material) obtained by adding and emulsifying 30 parts butyl acrylate, 70 parts 2-ethylhexyl acrylate, 4 parts acrylic acid (AA), 0.02 part 3-methacryloxypropyltrimethoxysilane (trade name "KBM-503" available from Shin-Etsu Chemical Co., Ltd.) as the silanol-forming monomer, 0.033 part dodecanethiol (chain transfer agent), and 2 parts sodium polyoxyethylene laurylsulfate (emulsifier) to 40 part ion-exchanged water; to promote the emulsion polymerization reaction. After the addition of the emulsion of the starting monomer material, the reaction mixture was stirred at the same temperature for 3 hours. To this, was added 10% aqueous ammonia to adjust the pH of the liquid phase to 7.5 to obtain an aqueous dispersion (emulsion) of the acrylic polymer. This acrylic polymer emulsion may be referred to as "emulsion e1" below. The weight-average molecular weight Mw and the gel fraction Gc of the acrylic polymer contained in this emulsion e1 was determined under the conditions indicated above.

An aqueous dispersion (emulsion) of reference polymer for the acrylic polymer of the emulsion e1 was obtained in the same way as the emulsion e1 except that 3-methacryloxypropyltrimethoxysilane (silanol-forming monomer) was not included in the starting monomer material. For the reference polymer contained in this emulsion, the gel fraction Ga was determined to be 14.0% by the method described above.

A PSA composition of Example 1 was obtained by adding to the emulsion e1, a tackifier emulsion (trade name "Super Ester E-865NT" available from Arakawa Chemical Industries, Ltd., a water dispersion of polymerized rosin having a softening point of 160° C.) at a ratio of 20 parts (based on the solid content) to 100 parts of the acrylic polymer contained in the emulsion.

This PSA composition was applied to a release liner obtained by treating a sheet of high-grade paper with a silicone-based release agent. By drying the composition at 100° C. for 2 minutes to form a PSA layer of about 70 μm thickness on the release liner, was obtained a substrate-free PSA sheet composed thereof. The substrate-free PSA sheet was stored at 50° C. for 3 days after prepared. A PSA sample was removed from the PSA sheet and the gel fraction Gb was determined for the post-crosslink PSA by the method described above.

In addition, a double-sided PSA sheet having a non-woven fabric substrate was prepared using the PSA composition. In particular, two sheets of release liner provided with a PSA layer of about 70 μm thickness were prepared in the same manner as described above and adhered respectively to both sides of a non-woven fabric substrate (product name "Seiren Youshi", fine paper available from Nippon Daishowa Paperboard Co., Ltd.) to obtain a double-sided PSA sheet. Both of the adhesive faces of this double-sided PSA sheet are thus protected with the release liners used in preparing the PSA sheet.

Example 2

An acrylic polymer emulsion (hereinafter, may be referred to as "emulsion e2") was prepared in the same way as Example 1 except that instead of 4 parts of AA, 3 parts of AA and 1 part of methacrylic acid (MAA) were used. A PSA composition of Example 2 was obtained by adding to the emulsion e2 the same tackifier emulsion at the same ratio as Example 1. A double-sided PSA sheet was prepared using this PSA composition by the same method as Example 1.

Example 3

An acrylic polymer emulsion (hereinafter, may be referred to as "emulsion e3") was prepared in the same way as Example 1 except that instead of 4 parts of AA, 2 parts of AA and 2 parts of MAA were used. A PSA composition of Example 3 was obtained by adding to the emulsion e3 the same tackifier emulsion at the same ratio as Example 1. A double-sided PSA sheet was prepared using this PSA composition by the same method as Example 1.

Example 4

An acrylic polymer emulsion (hereinafter, may be referred to as "emulsion e4") was prepared in the same way as Example 1 except that instead of 4 parts of AA, 1 part of AA and 3 parts of MAA were used. A PSA composition of Example 4 was obtained by adding to the emulsion e4 the same tackifier emulsion at the same ratio as Example 1. A double-sided PSA sheet was prepared using this PSA composition by the same method as Example 1.

With respect to the acrylic polymer contained in each of the acrylic polymer emulsions e2 to e4, the Mw and gel fraction Gc were determined in the same way as Example 1. Furthermore, the gel fraction Gb of the PSA obtained from each PSA composition of Examples 2 to 4 was determined in the same way as Example 1. Table 1 shows the results of the Mw, Gc and Gb measurements. Table 1 also shows the kind of acrylic polymer emulsion used in the preparation of each PSA composition of Examples 1 to 4 as well as the amounts of acrylic acid and methacrylic acid contained in the starting monomer material used for preparation of each emulsion. In addition, a reference polymer emulsion was prepared in the same way as Example 1 for the acrylic polymer contained in each of the emulsions e2 to e4. The gel fraction Ga of each reference polymer was measured and all were found to be about 14%.

TABLE 1

| | Emulsion | AA (parts) | MAA (parts) | Mw ($\times 10^4$) | Gc (%) | Gb (%) |
|---|---|---|---|---|---|---|
| Example 1 | e1 | 4 | 0 | 78.2 | 39.7 | 43.8 |
| Example 2 | e2 | 3 | 1 | 74.3 | 39.6 | 38.6 |
| Example 3 | e3 | 2 | 2 | 77.0 | 40.1 | 37.7 |
| Example 4 | e4 | 1 | 3 | 79.6 | 36.2 | 24.8 |

The double-sided PSA sheets of Examples 1 to 4 were stored for aging at 50° C. for 3 days from the production and evaluated for the properties described below. The results are shown in Table 2.

Peel Strength

A PSA layer was exposed by removing the release liner covering a first side of each double-sided PSA sheet and the exposed layer was backed by a sheet of PET film of 25 μm by adhering thereto. A test piece of 20 mm width and 100 mm length was cut out of the backed PSA sheet. The release liner was removed from a second side of the test piece and adhered to an adherend plate of stainless steal SUS 304 by reciprocating a 2-kg roller over the test piece once. After the test piece was stored at 23° C. for 30 minutes and the peel strength (in N/20 mm-width) was measured in accordance with JIS Z0237 with a tensile machine set at a pulling speed of 300 mm/min and a peeling angle of 180 degrees in an environment at 23° C. With 50% relative humidity.

High-Temperature Cohesive Strength (Heat Resistant Holding Strength)

A PSA layer was exposed by removing the release liner covering a first side of each double-sided PSA sheet and the exposed layer was backed by a sheet of PET film of 25 μm by adhering thereto. A test piece of 10 mm width and 100 mm length was cut out of the backed PSA sheet. The release liner was removed from a second side of the test piece and fixed to an adherend Bakelite plate over an area of 10 mm width and 20 mm length by reciprocating a 2-kg roller over the test piece once. The Bakelite plate was left hanging at 80° C. for 30 minutes and then a 500-g load was applied to the free end of the test piece. After leaving the Bakelite plate with the applied load at 80° C. for 1 hour, the degree (distance) of displacement of the test piece was measured in accordance with JIS Z0237.

Edge Peeling

A PSA layer was exposed by removing the release liner covering a first side of each double-sided PSA sheet and the exposed layer was applied to an aluminum sheet of 0.5 mm thickness, 10 mm width and 90 mm length to prepare a test piece. The length of each test piece was wrapped around a φ-50 mm round rod to form an arch. The release liner was removed from a second side of the test piece and the test piece was press-bonded to a polypropylene plate using a laminator. After this was left at 23° C. for 24 hours and then at 70° C. for 2 hours, the height (mm) of the edge of the test piece lifted from the surface of the polypropylene plate was measured.

Foam Repulsion Resistance

The release liner covering a first face of the double-sided PSA sheet was removed to expose the PSA layer and a piece of urethane foam (trade name "ECS foam" available from Inoac Corporation) of 10 mm thickness was adhered thereto using a hand roller. Of this, a test piece of 10 mm width and 50 mm length was cut out. The release liner was removed from a second face of the test piece to expose the PSA layer and the test piece was adhered to a first side of an acrylonitrile-butadiene-styrene copolymer resin plate (ASB plate) of 2 mm thickness over an area of 10 mm width and 10 mm length by reciprocating a 2-kg roller once. Subsequently, the remaining portion (10 mm width by 40 mm length) of the test piece was adhered to a second side of the ABS plate by bending the piece. After this was stored at 23° C. for 24 hours and further at 70° C. for 2 hours, was measured the height (mm) of the edge of the test piece lifted from the first side (the side with an adhered area of 10 mm width and 10 mm length) of the ABS plate.

TABLE 2

| | Peel Strength (N/20 mm) | Cohesive Strength (mm/hr) | Edge Peel (mm) | Foam Repulsion Resistance (mm) |
|---|---|---|---|---|
| Example 1 | 13.4 | 0.9 | 0.3 | 10.0 |
| Example 2 | 12.5 | 1.4 | 0.1 | 0.9 |
| Example 3 | 12.9 | 1.9 | 0.1 | 1.2 |
| Example 4 | 13.1 | 2.5 | 0.3 | 1.4 |

As shown in Table 2, all of the PSA sheets of Examples 1 to 4 exhibited a peel strength of 12 N/20 mm or greater (even 12.5 N/20 mm or greater), no fall of the test piece during the high-temperature cohesive strength test, and an edge-peel height of 2 mm or less (even 0.5 mm or less) in the edge peel test. That is, they all showed the three properties of adhesiveness, high-temperature cohesive strength, and edge peel resistance at a great balance. As compared to the PSA sheet of Example 1 obtained from a starting monomer material containing only AA of AA and MAA as for the ethylenic unsaturated monocarboxylic acid, with the PSA sheets of Examples 2 to 4, where both AA and MAA were used, the foam repulsion resistance was significantly increased. In particular, all of the PSA sheets of Examples 2 to 4 showed a lifted height of 5 mm or less (even 2 mm or less) in the foam repulsion resistance test. Thus, the PSA sheets of Examples 2 to 4 all exhibited the four properties of adhesiveness, high-temperature cohesive strength, edge peel resistance and foam repulsion resistance at high levels and a good balance. With Examples 1 to 3 where both AA and MAA were used at a ratio varied between 3:1 to 1:3 while the combined amount of AA and MAA was fixed (i.e., PSA sheets that differ from each other only in the mass ratio of AA to MAA in the starting monomer material), as the ratio of AA to MAA increased, both the high-temperature cohesive strength and foam repulsion resistance increased. Examples 2 and 3, where the ratio AA:MAA was between 1:1 and 3:1, showed especially good results.

Example 5

A starting monomer material having the same composition as Example 4 was used. An emulsion of the starting monomer material was added dropwise over 4 hours in this example while the same emulsion was added dropwise over 3 hours in Example 4. Otherwise, an acrylic polymer emulsion (hereinafter may be referenced to as "emulsion e5") was prepared in the same way as Example 1. A PSA composition of Example 5 was obtained by adding to the emulsion e5 the same tackifier emulsion at the same ratio as Example 1. A double-sided PSA sheet was prepared using this PSA composition by the same method as Example 1.

Example 6

An acrylic polymer emulsion (hereinafter, may be referred to as "emulsion e6") was prepared in the same way as Example 1 except that instead of 4 parts of AA, 2 parts of AA and 3 parts of MAA were used. A PSA composition of Example 6 was obtained by adding to the emulsion e6 the same tackifier emulsion at the same ratio as Example 1. A double-sided PSA sheet was prepared using this PSA composition by the same method as Example 1.

Example 7

An acrylic polymer emulsion (hereinafter, may be referred to as "emulsion e7") was prepared in the same way as Example 1 except that instead of 4 parts of AA, 3 parts of AA and 3 parts of MAA were used. A PSA composition of Example 7 was obtained by adding to the emulsion e7 the same tackifier emulsion at the same ratio as Example 1. A double-sided PSA sheet was prepared using this PSA composition by the same method as Example 1.

With respect to the acrylic polymer contained in each of the acrylic polymer emulsions e5 to e7, the Mw and Gc were determined as the emulsions e1 to e4. A reference polymer emulsion was prepared in the same way as Example 1 the acrylic polymer contained in each of the emulsions e5 to e7 and the Ga of the reference polymer was determined. For the emulsion e5, the emulsion of the starting monomer material without the silanol-forming monomer was added over 4 hours. The gel fraction Gb of each PSA of Examples 5 to 7 was determined in the same way as Example 1. Table 3 shows the results of the Mw, Gc and Gb measurements. The Ga of reference polymer was about 14% with any of the emulsions e5 to e7. Table 3 also shows the kind of acrylic polymer emulsion used in the preparation of each PSA composition of Examples 5 to 7 as well as the amounts of acrylic acid and methacrylic acid contained in the starting monomer material used for preparation of each emulsion.

TABLE 3

| | Emulsion | AA (parts) | MAA (parts) | Mw (×10⁴) | Gc (%) | Gb (%) |
|---|---|---|---|---|---|---|
| Example 5 | e5 | 1 | 3 | 65.8 | 44.0 | 33.5 |
| Example 6 | e6 | 2 | 3 | 69.7 | 39.6 | 34.4 |
| Example 7 | e7 | 3 | 3 | 68.3 | 41.4 | 39.8 |

Each of the double-sided PSA sheets prepared in Examples 5 to 7 was stored for aging at 50° C. for 3 days after the production and evaluated for the peel strength, high-temperature cohesive strength, edge peel and foam repulsion resistance by the same way as the PSA sheets of Examples 1 to 4. The results are shown in Table 4.

TABLE 4

|  | Peel Strength (N/20 mm) | Cohesive Strength (mm/hr) | Edge Peel (mm) | Foam Repulsion Resistance (mm) |
|---|---|---|---|---|
| Example 5 | 12.1 | 2.0 | 0.1 | 0.8 |
| Example 6 | 13.6 | 1.0 | 0.2 | 4.8 |
| Example 7 | 13.0 | 1.1 | 0.1 | 3.1 |

As shown in Table 4, all of the PSA sheets of Examples 5 to 7 exhibited a peel strength of 12 N/20 mm or greater, no fall of the test piece during the high-temperature cohesive strength test, an edge-peel height of 2 mm or less (even 0.5 mm or less) in the edge peel test, and a lifted height of 5 mm or less in the foam repulsion resistance test. That is, they all showed the four properties of adhesiveness, high-temperature cohesive strength, edge peel resistance and foam repulsion resistance at high levels and a great balance.

As shown in Table 4, when the combined amount of AA and MAA was 5 parts or more, the foam repulsion resistance tended to decrease. With respect to the example prepared in the same way as Example 1 except that the amount of AA contained in the starting monomer material was 2 parts instead of 4 parts, it was observed that the high-temperature cohesive strength was lower than that of the PSA sheet of Example 1. These results indicate that an especially preferred starting monomer material contains 3 parts to 4.5 parts of an ethylenic unsaturated carboxylic acid (preferably, AA and MAA) to 100 parts of alkyl(meth)acrylate.

The following examples show that with a PSA composition that is primarily composed of an acrylic polymer obtained by polymerizing a starting monomer material containing an alkyl(meth)acrylate as the main monomer and a silanol-forming monomer and further containing only one of AA and MAA (for instance, only AA); and that meets the requirements for the Mw, Ga and Gb; can be obtained a high performance PSA that exhibits high levels of adhesiveness, high-temperature cohesive strength and edge peel resistance in a good balance.

Example 8

An acrylic polymer emulsion (hereinafter, may be referred to as "emulsion e8") was obtained in the same way as Example 1, using a starting monomer material having the same composition as Example 1. A PSA composition of Example 8 was obtained by adding to the emulsion e8 the same tackifier emulsion at the same ratio as Example 1. A double-sided PSA sheet was prepared using this PSA composition by the same method as Example 1.

Example 9

An acrylic polymer emulsion (hereinafter, may be referred to as "emulsion e9") was prepared in the same way as Example 1 except that 0.015 part 3-methacryloxypropyltrimethoxysilane and 0.03 part dodecanethiol were used. A PSA composition of Example 9 was obtained by adding to the emulsion e9 the same tackifier emulsion at the same ratio as Example 1. A double-sided PSA sheet was prepared using this PSA composition by the same method as Example 1.

Example 10

A starting monomer material having the same composition as Example 1 was used. The emulsion was added dropwise over 4 hours in this example instead of 3 hours in Example 1. Otherwise, an acrylic polymer emulsion (hereinafter, may be referred to as "emulsion e10") was prepared in the same way as Example 1. A PSA composition of Example 10 was obtained by adding to the emulsion e10 the same tackifier emulsion at the same ratio as Example 1. A double-sided PSA sheet was prepared using this PSA composition by the same method as Example 1.

Example 11

An acrylic polymer emulsion (hereinafter, may be referred to as "emulsion e11") was prepared in the same way as Example 1 except that 0.04 part 3-methacryloxypropyltrimethoxysilane and 0.036 part dodecanethiol were used. A PSA composition of Example 11 was obtained by adding to the emulsion e11 the same tackifier emulsion at the same ratio as Example 1. A double-sided PSA sheet was prepared using this PSA composition by the same method as Example 1.

Example 12

An acrylic polymer emulsion (hereinafter, may be referred to as "emulsion e12") was prepared in the same way as Example 1 except that 0.06 part 3-methacryloxypropyltrimethoxysilane and 0.036 part dodecanethiol were used. A PSA composition of Example 12 was obtained by adding to the emulsion e12 the same tackifier emulsion at the same ratio as Example 1. A double-sided PSA sheet was prepared using this PSA composition by the same method as Example 1.

The Mw was determined for each of the acrylic polymer emulsions e8 to e12 in the same way as emulsions e1 to e7. With respect to each of the emulsions e8 to e12, an emulsion of reference polymer for the acrylic polymer contained in each emulsion was prepared in the same way as Example 1; and the Ga of the reference polymer was determined. For emulsion e10, an emulsion of the starting monomer material without a silanol-forming monomer was added dropwise over 4 hours. The gel fraction (Gb) of the PSA prepared from each PSA composition of Examples 8 to 12 was determined in the same way as Example 1. The results of these Mw, Ga and Gb measurements are shown in Table 5. Table 5 also shows the type of the acrylic polymer emulsion used to prepare each PSA composition of Examples 8 to 12.

The double-sided PSA sheets of Examples 8 to 12 were stored for aging at 50° C. for 3 days from the production and evaluated for the peel strength, high-temperature cohesive strength and edge peel resistance in the same way as the PSA sheets of Examples 1 to 7. These results are also shown in Table 5.

TABLE 5

|  | Emulsion | Mw ($\times 10^4$) | Ga (%) | Gb (%) | Peel Strength (N/20 mm) | Cohesive Strength (mm/hr) | Edge Peel (mm) |
|---|---|---|---|---|---|---|---|
| Example 8 | e8 | 86.8 | 14.0 | 41.3 | 13.3 | 1.1 | 1.3 |
| Example 9 | e9 | 92.6 | 12.0 | 41.4 | 14.3 | 0.9 | 0.9 |
| Example 10 | e10 | 67.1 | 16.0 | 48.0 | 14.4 | 0.9 | 0.4 |
| Example 11 | e11 | 62.1 | 7.2 | 44.7 | 14.1 | 0.6 | 14.8 |
| Example 12 | e12 | 44.7 | 7.2 | 49.8 | 13.8 | 0.4 | 15.2 |

As shown in Table 5, the PSA sheets of Examples 8 to 10 each having a PSA layer of 20% to 55% (more specifically, 30% to 55%, even 35% to 50%, especially 40% to 50%) in Gb formed of a PSA composition composed primarily of an acrylic polymer of $65\times10^4$ to $100\times10^4$ in Mw and 7% to 17% (more particularly, 10% to 17%) in reference polymer Ga, all exhibited a peel strength of 12 N/20 mm or greater (even 13 N/20 mm or greater), no fall of the test piece during the high-temperature cohesive strength test (furthermore, the distance of displacement after one hour was 2.5 mm or less, especially, 1.5 mm or less), and an edge-peel height of 2 mm or less (even 1.5 mm or less) in the edge peel test. That is, they all showed high levels of the three properties of adhesiveness, high-temperature cohesive strength, and edge peel resistance at a great balance. With these PSA compositions, by altering the composition of the starting monomer material so as to contain AA and MAA (for instance, by partially substituting MAA for AA), can be produced a PSA composition suitable for preparing a PSA sheet with the three properties maintained at high levels and further with increased foam repulsion resistance. In other words, high levels of the four properties of adhesiveness, high-temperature cohesive strength, edge peel resistance and foam repulsion resistance can be obtained in a good balance.

On the other hand, the PSA sheets of Examples 11 and 12 exhibited a peel strength and high-temperature cohesive strength both comparable to those of Examples 8 to 10, but were significantly inferior in edge peel resistance. That is, these sheets lacked a balance of the three properties (adhesiveness, high-temperature cohesive strength, and edge peel resistance) as compared to those of Examples 8 to 10.

The PSA compositions disclosed herein may produce a PSA and a PSA sheet having the same that are less likely to deteriorate with age (for instance, in one, two or more properties of Gb, adhesiveness, high-temperature cohesive strength and edge peel resistance). Supporting examples are described below.

In particular, the PSA sheet of Example 8 was stored at 70° C. for 7 days after preparation and subsequently subjected to measurements of gel fraction Gb, peel strength, high-temperature cohesive strength and edge peel strength in the same way as above. The results indicated that the peel strength, high-temperature cohesive strength and edge peel resistance were all at the levels comparable to the results shown in Table 5 (test results of the PSA sheets stored at 50° C. for 3 days) and also no decreases in Gb were observed.

Specific examples of the present invention are described in detail above, but these are merely for illustrations and do not limit the scope of the claims. The technology described in the claims includes various alterations and modifications of the specific examples described above.

As described above, the aqueous PSA composition of the present invention produces a PSA layer and a PSA sheet having said PSA layer that exhibits excellent foam repulsion resistance (preferably, adhesiveness, cohesive strength and edge peel resistance as well in a good balance). For instance, can be produced a PSA sheet having a PSA layer that is relatively thick (for example, of about 50 μm to 100 μm thickness) and that exhibits the properties described above at high levels. The composition of the present invention is desirable for preparing PSA sheets, for instance double-sided PSA sheets (including PSA tapes), having such a PSA layer. Especially, it is desirable for production of a double-sided PSA sheet that may be used for bonding a foam member to an adherend. With these properties, these PSA sheets are preferably used as a PSA tape for vehicle interiors (double-sided PSA sheet and the like for fixing vehicle interiors). The composition of the present invention is desirable for production of a double-sided PSA sheet having PSA layers on a foam sheet substrate (foam substrate). For instance, it is suitable for forming a PSA layer on a surface of a foam sheet to be fixed as a vehicle interior part.

What is claimed is:

1. A foam member fixing sheet for fixing a foam member to an adherend, wherein
   (a) the fixing sheet is a double-sided pressure sensitive adhesive sheet comprising a pressure sensitive adhesive layer formed of an aqueous pressure sensitive adhesive composition;
   (b) the aqueous pressure sensitive adhesive composition comprises an acrylic polymer, a tackifier, and water, wherein the acrylic polymer is dispersed in the water;
   (c) the amount of the acrylic polymer is greater than 50% by mass based on the solids content of the composition;
   (d) the acrylic polymer is obtained by polymerizing a starting monomer material comprising an alkyl(meth)acrylate, acrylic acid, and methacrylic acid,
   wherein
   the alkyl(meth)acrylate content of the total starting monomer material is greater than 50% by mass,
   the alkyl(meth)acrylate comprises a (meth)acrylic acid ester of a $C_{4-8}$ alkyl alcohol,
   the mass ratio of acrylic acid to methacrylic acid (AA: MAA) in the starting monomer is in the range of 1:4 to 4:1, and
   of the total amount of the alkyl(meth)acrylate contained in the starting monomer material, the (meth)acrylic acid ester of a $C_{4-8}$ alkyl alcohol amounts to 70 mass % or greater;
   (e) the tackifier is a rosin-based resin or a rosin derivative resin; and
   (f) the tackifier is present in an amount of 5 to 40 parts by mass based on 100 parts by mass of the acrylic polymer.

2. The foam member fixing sheet of claim 1, wherein the aqueous pressure sensitive adhesive composition satisfies all of the following conditions:
   the acrylic polymer comprises a tetrahydrofuran-soluble portion having a weight average molecular weight of $65\times10^4$ to $100\times10^4$;
   the starting monomer material further comprises a silanol-forming monomer;
   a polymer produced by polymerizing the starting monomer material without the silanol-forming monomer comprises an ethyl acetate-insoluble portion amounting to a gel fraction of 7% to 17% by mass; and
   a post-crosslinked pressure-sensitive adhesive formed from the pressure sensitive adhesive composition comprises an ethyl acetate-insoluble portion amounting to a gel fraction of 20% to 55% by mass.

3. The foam member fixing sheet of claim 1, wherein the pressure sensitive adhesive layer is provided on each side of a non-woven fabric substrate.

4. The foam member fixing sheet of claim 1, wherein, when the foam member fixing sheet is formed into a test piece with a width of 10 mm and a length of 50 mm, the test piece is lifted to an edge height of no greater than 5 mm from a first side of a resin plate in a foam repulsion resistance test, wherein the foam repulsion resistance test comprises:
   (1) adhering the test piece to a first side of an acrylonitrile-butadiene-styrene copolymer resin plate of 2 mm thickness over an area of 10 mm width and 10 mm length,
   (2) adhering the remaining portion of the test piece to a second side of the resin plate by bending the test piece,
   (3) storing the test piece on the resin plate at 23° C. for 24 hours and further at 70° C. for 2 hours, and (4) measuring the height in mm of an edge of the test piece that is lifted from the first side of the acrylonitrile-butadiene-styrene copolymer resin plate.

5. The foam member fixing sheet of claim 1, wherein the pressure sensitive adhesive layer after being crosslinked comprises an ethyl acetate-insoluble portion amounting to a gel fraction of 20% to 55% by mass.

6. The foam member fixing sheet of claim 1, wherein the starting monomer material further comprises a silanol-forming monomer.

7. The foam member fixing sheet of claim 1, wherein the tackifier is present in an amount of 15 to 30 parts by mass based on 100 parts by mass of the acrylic polymer.

8. The foam member fixing sheet of claim 1, wherein the tackifier is
   (i) a rosin-based resin selected from gum rosin, wood rosin, tall-oil rosin, a stabilized rosin, a polymerized rosin, and an unsaturated acid-modified rosin, or
   (ii) a rosin derivative resin selected from an esterified compound of a rosin-based resin set forth in (i) and a phenol modified compound of a rosin-based resin set forth in (i).

9. A foam member fixing sheet for fixing a foam member to an adherend, wherein
   (a) the fixing sheet is a double-sided pressure sensitive adhesive sheet comprising a pressure sensitive adhesive layer formed of an aqueous pressure sensitive adhesive composition;
   (b) the aqueous pressure sensitive adhesive composition comprises an acrylic polymer, a tackifier, and water, wherein the acrylic polymer is dispersed in the water;
   (c) the amount of the acrylic polymer is greater than 50% by mass based on the solids content of the composition;
   (d) the acrylic polymer is obtained by polymerizing a starting monomer material comprising an alkyl(meth)acrylate, acrylic acid (AA), and methacrylic acid (MAA);
   (e) a mass ratio of AA to MAA (AA:MAA) in the starting monomer material is in the range of 1:10 to 10:1;
   (f) the tackifier is a rosin-based resin or a rosin derivative resin; and
   (g) the tackifier is present in an amount of 5 to 40 parts by mass based on 100 parts by mass of the acrylic polymer.

10. A foam member fixing sheet for fixing a foam member to an adherend, wherein
   (a) the fixing sheet is a double-sided pressure sensitive adhesive sheet comprising a pressure sensitive adhesive layer formed of an aqueous pressure sensitive adhesive composition;
   (b) the aqueous pressure sensitive adhesive composition comprises an acrylic polymer, a tackifier, and water, wherein the acrylic polymer is dispersed in the water;
   (c) the amount of the acrylic polymer is greater than 50% by mass based on the solids content of the composition;
   (d) the acrylic polymer is obtained by polymerizing a starting monomer material comprising an alkyl(meth)acrylate, acrylic acid (AA), and methacrylic acid (MAA);
   (e) a mass ratio of AA to MAA (AA:MAA) in the starting monomer material is in the range of 1:10 to 10:1;
   (f) the tackifier is a rosin-based resin or a rosin derivative resin; and
   (g) the tackifier is present in an amount of 5 to 40 parts by mass based on 100 parts by mass of the acrylic polymer,
   wherein, when the foam member fixing sheet is formed into a test piece with a width of 10 mm and a length of 50 mm, the test piece is lifted to an edge height of no greater than 5 mm from a first side of a resin plate in a foam repulsion resistance test, wherein the foam repulsion resistance test comprises:
   (1) adhering the test piece to a first side of an acrylonitrile-butadiene-styrene copolymer resin plate of 2 mm thickness over an area of 10 mm width and 10 mm length,
   (2) adhering the remaining portion of the test piece to a second side of the resin plate by bending the test piece,
   (3) storing the test piece on the resin plate at 23° C. for 24 hours and further at 70° C. for 2 hours, and
   (4) measuring the height in mm of an edge of the test piece that is lifted from the first side of the acrylonitrile-butadiene-styrene copolymer resin plate.

\* \* \* \* \*